W. C. JOHNSON.
ANTISKID CHAIN.
APPLICATION FILED OCT. 15, 1918.
1,326,513.
Patented Dec. 30, 1919.
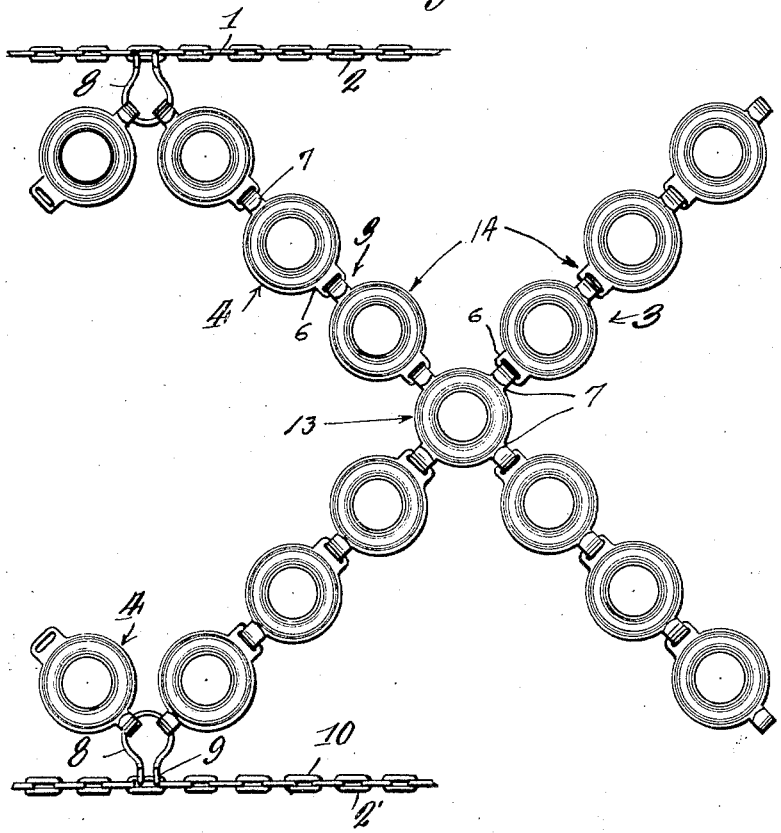
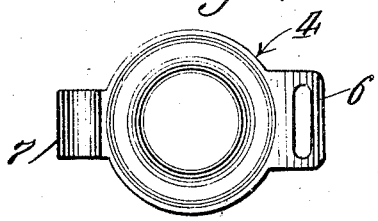
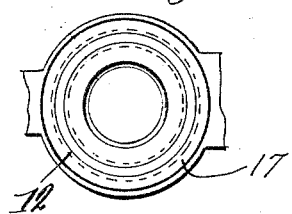
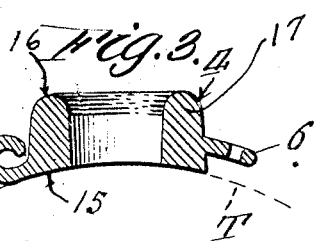
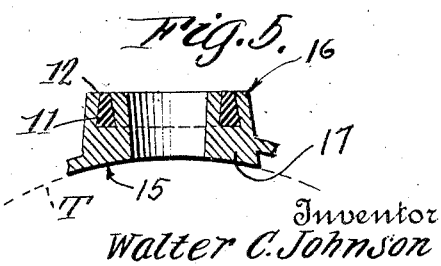
Witnesses
Guy M. Spring
S. M. McColl
Inventor
Walter C. Johnson
By Richard B. Owen
Attorney

UNITED STATES PATENT OFFICE.

WALTER C. JOHNSON, OF SMITHMILLS, PENNSYLVANIA.

ANTISKID-CHAIN.

1,326,513.  Specification of Letters Patent.  Patented Dec. 30, 1919.

Application filed October 15, 1918. Serial No. 258,139.

*To all whom it may concern:*

Be it known that I, WALTER C. JOHNSON, a citizen of the United States, residing at Smithmills, in the county of Clearfield and State of Pennsylvania, have invented certain new and useful Improvements in Antiskid-Chains, of which the following is a specification.

My invention relates to antiskid chains for motor vehicles and the object of the invention is to produce a chain of this type which is more efficient in operation, will act with greater certainty to prevent skidding, and is of generally improved construction.

In the drawings I have illustrated one embodiment which my invention may assume. In these drawings:

Figure 1 represents a plan view of a portion of an antiskid chain constructed according to this embodiment;

Fig. 2 represents a plan view of one of the gripping elements of this chain;

Fig. 3 represents a vertical longitudinal section of the element disclosed in Fig. 2; and Figs. 4 and 5 are views similar to Figs. 2 and 3 representing a modified construction of the gripping element.

In the embodiment of my invention herein disclosed I provide a pair of draw members to be disposed along the sides of the automobile tire T and herein disclosed as two side chains 1 and 10 each composed of a plurality of links 2. My antiskid chain also comprises a plurality of antiskid members extending between the cross chains 1 and 10 and these members may consist of cross chains such as the cross chain 3 disclosed in Fig. 1.

This cross chain is composed of a center element 13 from which radiates a series of arms 14 each connected at its free end to one of the side chains 1 or 10. Each of these arms 14 is composed of a plurality of links 4 and each of these links 4 is provided with suitable means to coöperate with another link, the center element 13, or a side chain, to secure the link to the other part. The center element 13 is also provided with means designed to coöperate with the securing means on the proximate end of the proximate link 4 of each arm 14 to secure these arms to the element 13. In the drawings, I have disclosed these securing means as hooks 7 and eyes 6. Each of the disks 4 is shown provided with a single hook 7 and a single eye 6 diametrically opposite the hook 7 while the element 13 is shown provided with a plurality of hooks 7 each coöperating with the eye 6 on the proximate end of each arm 14. These hooks and eyes are herein illustratively shown as projecting laterally from the disks 4 and element 13 at a point between the inner and outer faces thereof and the disks 4 and element 13 are herein illustratively shown as annuli provided with continuous airtight walls terminating in an inner face 15 which is concaved to conform to the curvature of the automobile tire and an outer face 16 which is preferably plane to correspond to the normally plane surface of the road. The outer face of each annulus, however, is preferably rounded.

I may construct the disks 4 and element 13 of hard rubber and prefer that the hardness of the rubber shall be approximately the same as that of ordinary tire rubber. I may, however, construct these gripping members as shown in Figs. 4 and 5 wherein each member is disclosed as formed of a metal body portion 17 formed in its outer face with a groove 11 in which is seated a small rubber annulus 12. In order to secure the annulus 12 in position in the groove 11, I find it desirable to undercut the groove as clearly shown in Fig. 5.

Secured to the side chains 1 and 10 at suitable intervals are suitable securing members such as the loops 8. These loops are each provided with bent fingers 9 hooked over a link in the side chain and bent down to hold the loop permanently secured to the chain. Each arm 14 of the cross chain 3 is secured to one of these loops 8 preferably by causing the hook 8 on the free end of the arm to embrace the loop. Each loop 8 occurring between adjacent cross chains may be engaged by two arms 14, as clearly shown in Fig. 1.

By constructing my cross chain in the form of a center element provided with a plurality of arms radiating therefrom and secured to the side chains, and more particularly in the form of a cross, I secure an antiskid chain which is firmly secured to the side chains to prevent distortion and destruction due to the strains imposed thereon. By providing the disks 4 and element 13 with connecting means, and particularly with coöperating hooks and eyes which are readily engageable and disengageable, I provide a structure wherein any gripping member may be readily replaced and in this way I both facilitate repairs and lessen the cost thereof.

By the construction of the gripping members 4 and 13 to engage both the tire and the road, which I herein disclose, and in particular by means of the use of a continuous annulus extending from the tire to the road, I provide gripping means which will secure the tire against lateral motion on the road. By placing the connecting hooks and eyes 6 and 7 nearer the tire than the plane of the outer face of the gripping members I prevent these connecting members from interfering with the action between the gripping member and the road.

By providing a plurality of these members to be disposed about the tire I provide in effect a surface substantially the same as that of the customary nonskid tire and accordingly permit the use of my device with a smooth tread tire or worn nonskid tire to secure the advantages of a new nonskid tire.

I am aware that there are advantages in my construction other than those specifically pointed out in the above specification. I am also aware that various changes and modifications may be made in the embodiment of my invention herein disclosed without departing from the object of my invention or sacrificing some or all of the advantages secured by my invention. So far as these other advantages, modifications, and changes are included within the scope of the appended claims they, therefore, are to be considered as part of my invention.

I claim—

1. In an antiskid chain, a cross chain comprising a multiplicity of gripping annuli each having continuous air tight walls terminating in an inner face concaved to correspond to the curvature of the tire and in an outer face comprising rubber of substantially the hardness of tire rubber and lying in a plane perpendicular to the axis of said annulus and normally disposed as far from the surface of said tire as any part of any of said annuli, whereby each annulus is adapted to simultaneously grip both the tire and the road to hold the tire to the road, and means so connecting said annuli that several thereof are in contact with said road at any time, whereby the effect of a nonskid tire is substantially achieved.

2. In an antiskid chain, a cross chain comprising a multiplicity of substantially similar inter-engaging gripping elements, each provided with an inner annular tire engaging face concaved to correspond to the curvature of the tire and adapted to lie against said tire throughout, whereby said element is adapted to grip said tire, and an outer face adapted to grip the road, whereby each element is adapted to simultaneously grip both the tire and the road to hold the tire to the road, and means so connecting said elements that several thereof are in contact with the road at any time, whereby the effect of a nonskid tire is substantially achieved.

3. In an antiskid chain, a cross chain comprising a multiplicity of substantially similar inter-engaging gripping elements, each provided with an inner annular face adapted to lie against said tire throughout, whereby said element is adapted to grip said tire, and an outer face adapted to grip the road, whereby each element is adapted to simultaneously grip both the tire and the road to hold the tire to the road, and means so connecting said elements that several thereof are in contact with the road at any time, whereby the effect of a nonskid tire is substantially achieved.

4. In an antiskid chain, a cross chain comprising a plurality of substantially similar interengaging gripping elements each provided with an inner annular face adapted to lie against the tire throughout, whereby said element is adapted to grip said tire, and an outer face adapted to grip the road, whereby said element will simultaneously grip both the tire and the road to hold the tire to the road.

5. A gripping link for an antiskid chain comprising an annulus terminating in an inner face concaved to conform to the curvature of the tire and an outer face comprising rubber of substantially the hardness of tire rubber and adapted to engage the road, and a plurality of connecting members secured to said annulus and projecting laterally therefrom between the two faces thereof.

In testimony whereof I affix my signature in presence of two witnesses.

WALTER C. JOHNSON.

Witnesses:
E. J. MOUNTZ,
W. I. KORMAN.